United States Patent Office 2,910,373
Patented Oct. 27, 1959

2,910,373
STABILIZATION OF PETROLEUM WAXES
Joseph A. Chenicek, Prairie View, Ill., assignor, by mesne assignments, to Universal Oil Products Company, Des Plaines, Ill., a corporation of Delaware
No Drawing. Application December 24, 1956
Serial No. 630,094
7 Claims. (Cl. 106—270)

This application is a continuation-in-part of copending application Serial No. 369,220, filed July 20, 1953 and now Patent No. 2,792,307. More particularly, the present invention relates to the stabilization of petroleum waxes.

Petroleum waxes undergo oxidative deterioration with the resultant undesirable discoloration, development of odors, development of acidity, and other undesirable reactions. The petroleum waxes include those synthtically prepared or naturally occurring. The synthetic waxes generally are produced from heavy hydrocarbon oils by chilling, filter pressing, sweating, etc., and include paraffin wax, petrolatum and micro-crystalline wax. Naturally occurring mineral waxes include ozokerite, etc.

In one embodiment the present invention relates to a method of stabilizing petroleum wax subject to oxidative deterioration which comprises incorporating therein a beta-alkylthioamide.

In a specific embodiment the present invention relates to a method of stabilizing paraffin wax which comprises incorporating therein from about 0.0001% to about 1% by weight of N,N'-methylene-bis-beta-ethylthiopropionamide.

In still another embodiment the present invention relates to petroleum wax subject to oxidative deterioration containing a stablizing concentration of a beta-alkylthioamide.

The beta-alkylthioamides for use in accordance with the present invention may be represented by the following general formula:

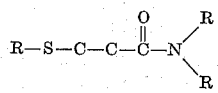

where R is selected from hydrogen, hydrocarbon and substituted hydrocarbon groups, the various R radicals being the same or different, and the hydrogen atoms, not illustrated, may be replaced by hydrocarbon and/or substituted hydrocarbon groups.

From the above general formula, it will be noted that the noval additive of the present invention contains a sulfur atom beta to the carbonyl group, to which carbonyl group also is attached a nitrogen atom. These compounds are readily prepared by the reaction of the desired acrylamide compound with a suitable sulfur compound. The acrylamide compounds include acrylamide, alpha-methacrylamide, alpha-ethylacrylamide, alpha-propylacrylamide, alpha - butylacrylamide, alpha - amylacrylamide, alpha-hexylacrylamide, etc., beta-methylacrylamide, (crotyl amide and isocrotylamide), beta-ethylacrylamide, beta-propylacrylamide, beta-butylacrylamide, beta-amylacrylamide, beta-hexylacrylamide, etc., N-methylacrylamide, N-ethylacrylamide, N-propylacrylamide, N-butylacrylamide, N-tertiary-butylacrylamide, N-amylacrylamide, N-hexylacrylamide, etc., N,N'-methylene-bis-acrylamide, N,N'-ethylene-bis-acrylamide, N,N'-propylene-bis-acrylamide, N,N'-butylene-bisacrylamide, N,N'-amylene-bis-acrylamide, etc., N,N'-alkylene-bis-acrylamides having hydrocarbon substituents attached in the alpha and/or beta positions including, for example, N,N'-methylene-bis-alpha-methylacrylamide, N,N'-methylene-bis-beta-methylacrylamide, N,N'-ethylene-bis-alpha-ethylacrylamide, etc. Other acrylamide compounds include: N,N'-ethylidene-bis-acrylamide, N,N'-propylidine-bis-acrylamide, N,N'-isopropylidene-bisacrylamide, N,N'-butylidene-bis-acrylamide, N,N'-cyclohexylidene-bis-acrylamide, etc., and N,N'-alkylidene-bis-acrylamides having substituents in the alpha or beta-positions.

Any suitable sulfur compound may be utilized in the preparation of these additives. Primary lower mercaptans are preferred, including methyl mercaptan, ethyl mercaptan, propyl mercaptan and butyl mercaptan, although higher molecular weight mercaptans containing up to 12 or more carbon atoms may be employed. In general, the primary mercaptans are more reactive than the secondary mercaptans, including isopropyl mercaptan, secondary butyl mercaptan, secondary amyl mercaptan, etc., which in turn are more reactive than the tertiary mercaptans, including tertiarybutyl mercaptan, tertiaryamyl mercaptan, tertiaryhexyl mercaptan, etc. While the alkyl mercaptans are preferred, it is understood that any suitable sulfur compound may be employed. Other sulfur compounds include hydrogen sulfide, aromatic mercaptans including thiophenols, thiocresols and particularly p-thiocresols, thiohydroquinone, mercaptobenzothiazole, etc.

It is apparent that numerous compounds may be prepared and utilized in accordance with the present invention. However, all these compounds will not necessarily be equivalent and may be of different effectiveness in different petroleum waxes.

As hereinbefore set forth, the particular additive will depend upon the reactants used in preparing the same. For example, the reaction of ethyl mercaptan with acrylamide produces beta-ethylthiopropionamide, the reaction of $H_2S$ with acrylamide produces beta-mercaptopropionamide, the reaction of ethyl mercaptan with N-tertiarybutyl acrylamide produces beta-ethylthio-N-tertiarybutyl propionamide, etc. Specific compounds herein set forth are intended as typical representative compounds but not with the intention of unduly limiting the broad scope of the present invention to these compounds. Other specific compounds include beta-propylthiopropionamide, beta-butylthiopropionamide, beta-amylthiopropionamide, etc., beta-phenylthiopropionamide, beta-tolylthiopropionamide, beta-xylylthiopropionamide, etc., beta-ethylthio-N-methylpropionamide, beta-ethylthio-N-ethylpropionamide, beta-ethylthio-N-propylpropionamide, beta-ethylthio-N-butylpropionamide, etc., beta-propylthio-N-tertiarybutylpropionamide, beta-butylthio-N-tertiarybutylpropionamide, beta-amylthio-N-tertiarybutylpropionamide, etc., beta-phenylthio-N-tertiarybutylpropionamide, beta-tolylthio-N-tertiarybutylpropionamide, beta-xylylthio-N-tertiarybutylpropionamide, etc., beta-ethylthiobutyramide, beta-propylthiobutyramide, beta-butylthiobutyramide, beta-amylthiobutyramide, etc., beta-phenylthiobutyramide, beta-tolylthiobutyramide, beta-xylyl-thiobutyramide, etc., beta-ethylthiovaleramide, beta-propylthiovaleramide, beta-butylthiovaleramide, beta-amylthiovaleramide, etc., beta-phenylthiovaleramide, beta-tolylthiovaleramide, beta-xylylthiovaleramide, etc.

In the general formula hereinbefore set forth, one or both of the R radicals attached to the nitrogen atom may be a substituted hydrocarbon group. In a preferred embodiment, this group comprises an alkyl group substituted with an

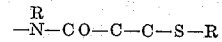

radical and the additive thus comprises compounds as N,N' - methylene - bis - beta - ethylthiopropionamide, N,N' - methylene - bis - beta - propylthiopropionamide, N,N' - methylene - bis - beta - butylthiopropionamide, etc., N,N'-ethylene-bis-beta-ethylthiopropionamide, N,N'-ethylene - bis - beta - propylthiopropionamide, N,N'-ethylene - bis - beta - butylthiopropionamide, etc., N,N'- ethylidene - bis - beta - ethylthiopropionamide, N,N'-isopropylidene-bis-beta-ethylthiopropionamide, etc.

The bis compounds hereinbefore disclosed may be represented by the following general formula:

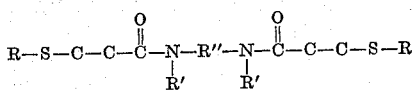

wherein R is selected from the group consisting of hydrogen and an alkyl group containing from 1 to about 12 carbon atoms, R' is selected from the group consisting of hydrogen and alkyl groups containing from 1 to about 6 carbon atoms, and R" is an alkylene group containing from 1 to about 6 carbon atoms.

The reaction of the acrylamide and sulfur compound may be effected in any suitable manner. In one method, a suspension of acrylamide in dioxane, methanol or other suitable solvent is prepared, and the required equivalent of sulfur compound is added, together with a catalytic amount of a suitable basic material including, for example, sodium methylate, piperidine, etc. When the mono-alkylthio compound is desired, one equivalent of sulfur compound is utilized. When the di-alkylthio compound is desired, two equivalents of the sulfur compound are employed with an N,N'-alkylene or alkylidene-bis-acrylamide. After the reaction has been completed, the solvent may be evaporated and the product recovered in any suitable manner, which will depend upon whether it is a solid or liquid. The solid may be recovered by re-crystallizing from a suitable solvent as, for example, hydrocarbon, alcohol, etc.

The antioxidant of the present invention generally is incorporated in petroleum wax in an amount of less than about 1% by weight and preferably in an amount of from about 0.0001% to about 1% by weight. The antioxidant may be used alone or in conjunction with synergists, metal deactivators, etc.

The following examples are introduced to illustrate further the novelty and utility of the present invention but not with the intention of unduly limiting the same.

EXAMPLE I

The paraffin wax used in this example was evaluated according to the TAPPI–ASTM Method, which is the presently recognized method for evaluating the stability of wax. Briefly, this method comprises placing 75 grams of wax shavings into an oxidation tube, placing the tube into a constant temperature bath maintained at 275° F., scrubbed air is passed into the melted wax and a small portion of the wax periodically is tested for peroxide number. The number of minutes required to reach a peroxide number of 50 is reported.

The antioxidant used in this example is N,N'-methylene-bis-beta-ethylthiopropionamide, and was prepared as follows: To a suspension of N,N'-methylene-bis-acrylamide in methanol were added two equivalents of ethyl mercaptan and a catalytic amount of piperidine. The mixture was warmed to 30° C. and stirred until all of the amide went into solution. The product was cooled, filtered and recrystallized from methanol. The product is a solid, white crystals, having a melting point of 176–178° C. and an empirical formula of $C_{11}H_{22}O_2N_2S_2$.

0.01% by weight of the antioxidant prepared in the above manner was incorporated in a sample of commercial paraffin wax and the wax was tested in the manner described above. At the same time a control sample (not containing this additive) of the paraffin wax was also run. The results of these runs are reported in the following table:

Table I

| Inhibitor: | Minutes to reach peroxide No. of 50 |
|---|---|
| None | 130 |
| N,N' - methylene - bis - beta - ethylthiopropionamide | 1940 |

From the data in the above table, it is apparent that the antioxidant of the present invention was of exceptional potency in stabilizing the paraffin wax.

EXAMPLE II

The antioxidant used in this example is beta-ethylthiopropionamide, which was prepared as follows: To a suspension of acrylamide in dioxane were added one equivalent of ethyl mercaptan and a catalytic amount of sodium methylate. The temperature rose rapidly. After the reaction was completed, the solvent was evaporated and the product recrystallized from a hydrocarbon mixture. The product is a solid, white crystals, melting point of 65 to 66° C. The compound has the empirical formula of $C_5H_{11}ONS$. The percent sulfur by calculation is 24.0% and the percent sulfur by analysis was 23.8%.

When incorporated in another sample of the paraffin wax described in Example I, this antioxidant serves to considerably prolong the stability of the wax.

EXAMPLE III

The antioxidant of this example is beta-ethylthio-N-tertiarybutylpropionamide, which is prepared in substantially the same manner as described in Example II, except that N-tertiarybutylacrylamide was utilized. The product is a liquid having a boiling point of 102°–104° C./0.6 mm. The product has an empirical formula of $C_{19}H_{19}ONS$. The calculated percent of sulfur is 16.9% and the amount of sulfur determined by analysis was 16.5%.

This antioxidant is incorporated in a concentration of 0.02% by weight in microcrystalline wax and serves to considerably prolong the stability thereof.

I claim as my invention:

1. Petroleum wax subject to oxidative deterioration containing, as an inhibitor against said deterioration, a stabilizing concentration of a beta-alkyl-thioamide having at least two carbon atoms in straight chain arrangement with the carbon atom of a carbonyl group, a sulfur atom on the carbon atom beta to the carbonyl group and a nitrogen atom attached to the carbon atom of the carbonyl group.

2. Petroleum wax subject to oxidative deterioration containing, as an inhibitor against said deterioration, a stabilizing concentration of a beta-alkylthio-N-alkylpropionamide having a sulfur atom on the carbon atom beta to the carbonyl group.

3. Petroleum wax subject to oxidative deterioration containing, as an inhibitor against said deterioration, a stabilizing concentration of a N,N'-alkylene-bis-beta-alkylthiopropionamide having a sulfur atom on the carbon atom beta to the carbonyl group.

4. Paraffin wax subject to oxidative deterioration containing, as an inhibitor against said deterioration, a stabilizing concentration of N,N'-methylene-bis-beta-ethylthiopropionamide.

5. A composition as defined in claim 1 further characterized in that the alkyl group of the inhibitor compound contains from 1 to about 12 carbon atoms.

6. A composition as defined in claim 2 further characterized in that the first-mentioned alkyl group of the inhibitor compound contains from 1 to about 12 carbon atoms and the second-mentioned alkyl group contains from 1 to about 6 carbon atoms.

7. A composition as defined in claim 3 further characterized in that the alkyl group of the inhibitor compound contains from 1 to about 12 carbon atoms and the alkylene group contains from 1 to about 6 carbon atoms.

References Cited in the file of this patent

UNITED STATES PATENTS 2,707,705   Rozman _____ May 3, 1955